United States Patent [19]

Friedenberg et al.

[11] 3,924,609
[45] Dec. 9, 1975

[54] DETECTOR DEVICE AND PROCESS FOR DETECTING OVULATION

[76] Inventors: Robert Friedenberg, 8792 Oxwell Lane, Laurel, Md. 20810; William Reese, Sterling, Va. 22170; William H. Reading, III, 3432 Brookwood Drive, Fairfax, Va. 22003

[22] Filed: July 2, 1974

[21] Appl. No.: 485,262

[52] U.S. Cl. .......................... 128/2.1 R; 128/2.1 Z
[51] Int. Cl.² ............................................. A61B 5/05
[58] Field of Search............ 128/2.1 R, 2.1 Z, 2.1 E, 128/2 R; 324/71 R

[56] References Cited
UNITED STATES PATENTS

| | | | |
|---|---|---|---|
| 3,528,405 | 9/1970 | Schuler | 128/2.1 R |
| 3,749,089 | 7/1973 | Derr | 128/2.1 F |
| 3,802,419 | 4/1974 | Yates | 128/2.1 Z |
| 3,844,276 | 10/1974 | McDougall | 128/2.1 R |

FOREIGN PATENTS OR APPLICATIONS

| | | | |
|---|---|---|---|
| 178,603 | 3/1966 | U.S.S.R. | 128/2.1 Z |

OTHER PUBLICATIONS

Edmonds et al., "Millvoltmeter and Electrodes for Measurement of Rectal Potential . . .", Med. & Biol. Eng., Vol. 8, No. 4, pp. 409–410, 1970.

Primary Examiner—Robert W. Michell
Assistant Examiner—Lee S. Cohen

[57] ABSTRACT

A test procedure and apparatus is provided for actually determining the low D.C. potentials of the order of milli-volts for measurement and identifying the different phases as well as the fact of ovulation in adult mammalian females. The measurement device will visibly indicate the phases as actual potential calibrated to milli-volts from a circuit formed of solid state and low noise elements in which a high input impedance is combined with high common mode rejection with significant processing techniques which includes input filtering to exclude extraneous as well as body induced currents.

15 Claims, 4 Drawing Figures

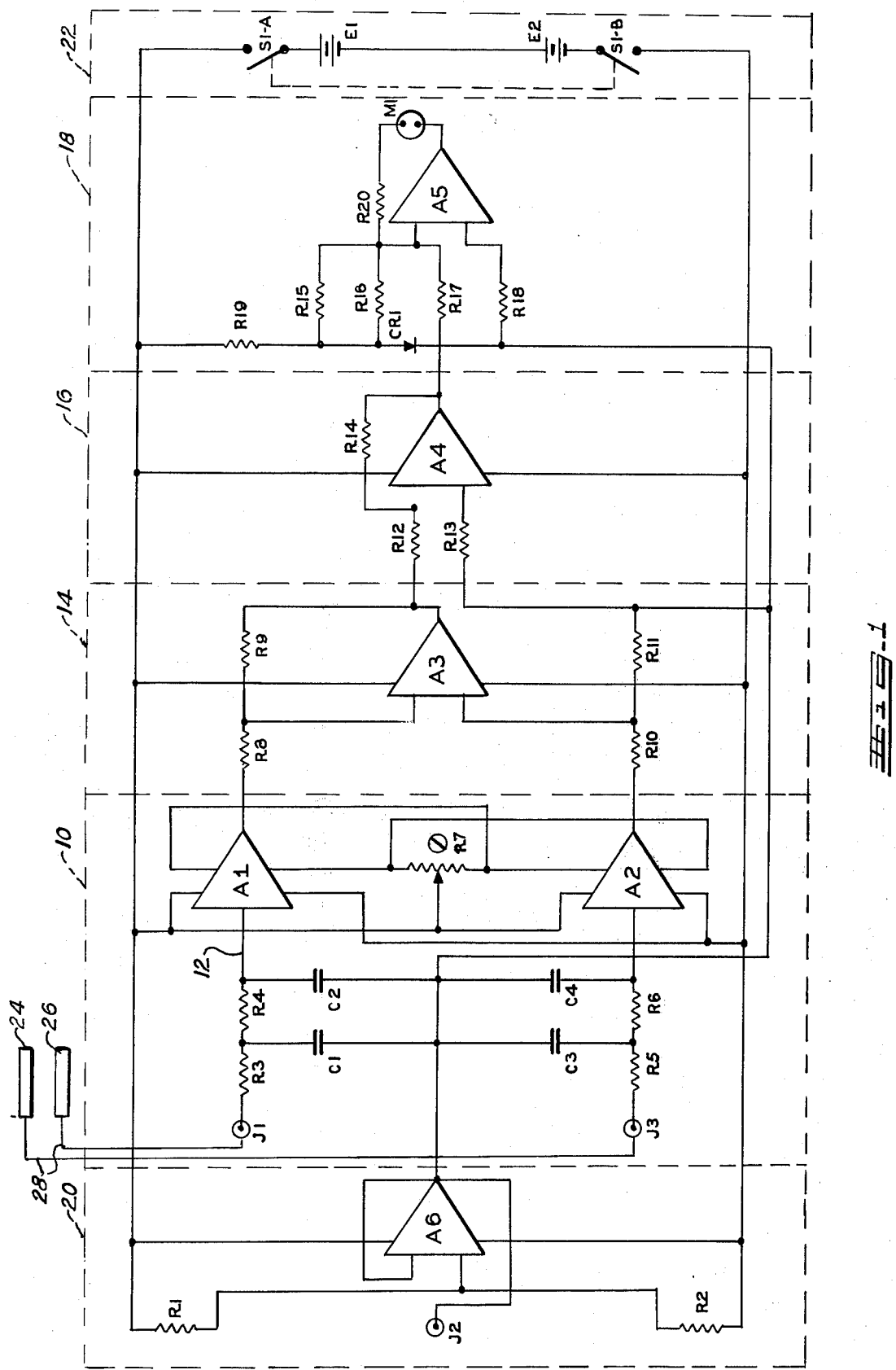

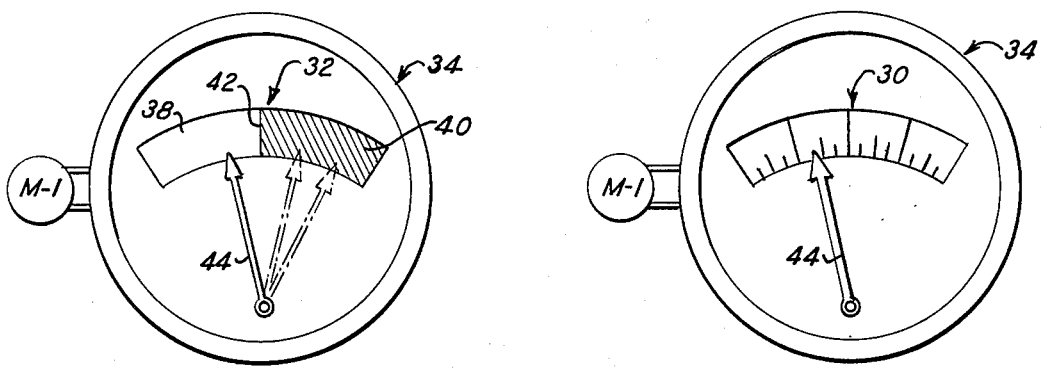
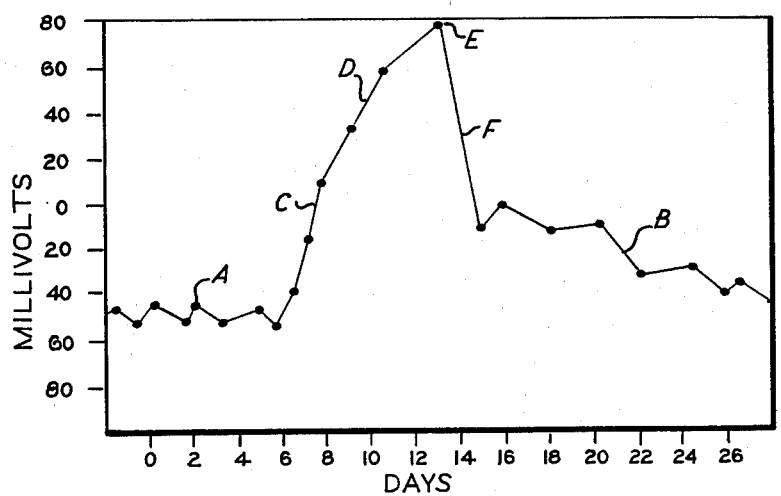

DETECTOR DEVICE AND PROCESS FOR DETECTING OVULATION

This invention relates to a method and apparatus for measurement of small potentials developed during the ovulation cycle in mature mammalian females; and for controlling fertilization of ova accordingg to accurate small potential measurement.

Numerous efforts have been made in the art to accurately determine the timing and fact of ovulation as an aide both for alternately achieving and avoiding fertilization of the ovum by the timed presence or absence of male spermatozoa. These prior efforts include measurement of cyclical body temperatures, cytological evaluation of exfoliated cells in vaginal mucosa, endometrial biopsy, biochemical including hormone change analysis, and it was even suggested to measure vaginal potential changes over the total ovulation cycle. See Yale J. Biol. & Med. 21 249–253 (1949). These prior efforts had inadequate sensitivity for such low D.C. potentials to serve the purpose of easy, dependable, and accurate measurement, sufficient to provide adequately reliable indication at a remote measurement point of the deep-seated condition of the cycle, including the fact and timing of ovulation occurrence.

There is a periodicity to ovulation, variable in human females usually from 26 to 28 days, and even the same female will occassionally vary in ovulation cycle timing due to hormone levels, state of health and age of the individual. The ovum grows or ripens into a primary follicle each month, increasing many fold in size with a corresponding increase in the number of cells surrounding each ovum in several distinct tissue layers, the follicle cavity being filled with liquid or follicular fluid in which the ovum is eccentrically disposed. Chromosome changes occur in the ovum and the structure of the follicle changes until spontaneous discharge of the ovum and fluid contents into the uterus in anticipation of fertilization. The cellular process leading to these changes is active with the elaboration of ovulatory enzymes which also affects the collagen supporting network of the follicle and ovary. A consequence is that for some 5 or 6 days before ovulation, the rapid growth of the ovum proceeds to the actual event of ovulation. The follicle bursts and sweeps the ovum and fluid into the fallopian tubes ultimately to the uterus. That rupture of the follicle tissue in the presence of the streaming follicular fluid produces a predictable small potential which can be calculated. (Electrostatics of Biological Cell Membranes, pages 83–106, R. M. Friedenberg 1967 by North Holland, Pub. Amsterdam.)

Each phase of the ovulatory cycle beginning with the periodic ripening of the follicle and ovulation through a final expulsion of the ovum from the uterus signals small measurable electrostatic potentials variably developed and steadily rising with the succeeding steps of the process and which achieve a higher and sharp peak of D.C. potential output at about the time of ovulation, then reducing, providing a direct current potential whose measurement allows the identification of the phases and timed sequence of this physiological event over a period of about 27 days. The potentials of the cycle will change from a normally minus to a plus potential as the event proceeds reaching a maximum during ovulation. The ovum proceeds through the fallopian tubes and then to the uterus where it remains for about 12 hours awaiting fertilization at decreased potential; and after expulsion, the potential slowly returns to a normal, minus, i.e., opposite polarity value.

The site of the potential source is deep-seated, difficult in any case to measure remotely, and the convenience of remote measurement as by external contacts on the body surface, more conveniently by contact of electrodes with the hands or fingers of the individual to be measured is a desirable advantage. Moreover, the magnitude of the output potential can be roughly measured in milli-volts, and by ultra filtration of other body potentials with more elaborate circuitry, can be measured in micro-volts, values that are comparatively very small with respect to other body potential sources such as the heart muscle. The problem of isolating the ovulation source potential and measurement of such quantity, however, is made more difficult by the presence of such conflicting body potentials.

According to one aspect of the present invention the small potential indicating the phase of the ovulatory cycle and the fact of ovulation is quickly and easily determined by contacting different external surface positions of a female body, such as by holding a contact in each hand, or between two fingers of each or either hand, whereby such body outlet contacts are the source of potential to be measured as widely separated surface portions of the body, in a position most conveniently available for application of electrodes for such contact with the body.

This aspect further includes the combination of the small potential measuring technique combined with potential measuring means comprising the essential circuitry including high impedance and common mode rejection as its characterizing features.

In a second aspect of this invention, a low potential measuring device is provided for non-technical or general use having high impedance and a common mode rejection sufficiently sensitive to accurately indicate an ovulation condition in measurable milli-volts or even more simply, to show only the contrasting conditions of ovulation or no ovulation, when applied for ovulation test by any female individual.

In a third aspect of this invention, a low potential measuring device is provided for the ovulation measurement in which high impedance and common mode rejection are combined in circuitry with sufficient filtration means to more fully isolate the limited electromagnetic fields and other sources of body potential, filtering with circuitry including careful filtering means of such extraneous potentials to isolate the measurement signal of the ovulatory process in terms of milli-volts.

In a fourth aspect of this invention, the extremely sensitive circuit isolated from interfering potentials may be activated by ordinary dry electro contact with separated surfaces of the body, either dry and without conductive substance, or with any conductive material to enhance contact such as salt water, conductive jellies or powders, in some contrast to prior art procedures requiring a silver-silver-chloride cell electrodes as such body contact.

Further aspects of this invention include identification of the inception of ovulation indicated and measurable upon a rising curve, by measurement of the slopes at several points well below the peak signal obtained during the actual event of ovulation several days preceeding the actual fact, such slope measurement sufficing to indicate visually that stage of the ovulation cycle with the present instrumentation, having an adjusted indicator dial to signal ovulation a few days in advance of the actual fact.

These and other objects of the invention will be inherent in the description given, reference being here made to the drawings for further illustration of the procedure and apparatus, and these will be regarded as exemplary and not limiting.

In the drawings:

FIG. 1 shows the combined circuitry for milli-volt measurement including the critical means of high impedance and high common mode rejection combined with sufficient isolation and filtration of the essential circuit to reliably indicate and measure the low D.C. ovulation potential;

FIG. 2 is a form of dial mechanism indicating a peak potential calibrated as the actual test output of the body either calibrated in milli-volts or micro-volts for use with circuitry of FIG. 1;

FIG. 3 is an observable dial instrument used with FIG. 1 circuit calibrated to indicate both the fact as well as the advent several days in advance of ovulation whereby the test user may receive some non-technically trained observation of the dial whether ovulation is imminent or present; and FIG. 4 is a curve graphing the approximate potential vs. a time cycle to show the approximate rise potential before a peak was reached illustrating both the anticipating as well as the fact time-wise of ovulation.

Referring to FIG. 1, the first circuit portion is shown as a network 10 isolated by the dotted line block. It comprises a two section RC filter 12 which includes a network of condensers C1, C2, C3 and C4, and resistors R3, R4, R5 and R6 in series with input leads connected to J1 and J3 and an active differential input buffer amplifier A1 and A2 which features high common mode rejection coupled with very high input impedance. That input impedance critically exceeds $10^9$ ohms, is preferably in the range of $10^{10}$ to $10^{14}$, and typically it is $10^{10}$ ohms or greater. The purpose of this RC filter relatively is to reduce the effects of any AC signal which may be present. The high input impedance, which is anologous to low bias current, is necessary to the present application in order to maintain a high level of sensitivity for the low D.C. potential measurement. Amplifiers A1 and A2, selected for this input, are matched to within 0.1% in order to provide high common mode rejection. They have a low specified noise figure and also possess a minimum specified input impedance. These characteristics are selected because the high input impedance is necessary to prevent loading of the actual signal source. Low noise is necessary to prevent masking the low level signals of interest. Gain match is necessary for high common mode rejection, i.e., 0.1% match will insure a minimum of 60db common mode rejection. Each of these effects are produced in the network 10.

A second network 14 is a differential to single ended operational amplifier with unity gain. This network is composed of amplifier A3, the active element, and resistors R8, R9, R10 and R11. The gain of this stage is not critical and unity gain is chosen for ease of component match. This stage is also low noise and provides a minimum of 28db additional common mode rejection.

A third network 16 is composed of an active amplifier device A4, coupled to resistors R12, R13 and R14. A4 is a straight gain amplifier in which the gain is selected to provide full scale deflection of the indicator at maximum expected signal input. The maximum active potential signal which may be expected is a nominal 70 milli-volts. Low noise device is utilized for this stage also.

A fourth network section 18 is composed of an active amplifier device A5 and resistors R15, R16, R17, R18, R19 and R20 in conjunction with diode CR1 and display meter M1. The primary purpose of this section 18 is to translate the potential input from the preceeding stage into a current which drives the indicating instrument in both a positive and negative direction dependent upon the polarity of input potential by way of meter M1. That meter M1 is a visible display means to read the output either as shown by the display element 30 of FIG. 2 or the display element 32 of FIG. 3.

A fifth network 20 is composed of an active device A6 and resistors R1 and R2. This network provides a precision internal reference for all measurements and allows the overall calibration to be reduced to single variable control, which is of the "set and forget" variety. The overall circuit is powered by batteries E1 and E2 via the power on-off switches S1A and S1B in circuit section 22. The reference input, which has been internally derived, is provided to the external world via connector J2 for ease of external use.

The electrode 24 and 26 are conductive metal bodies of any good conductive metal. However, in use it is often desireable to wet the fingers of the hands with a conductive solution such as ordinary salt water or a conductive gel as in common use for body contact, to assure optimum contact with the body surface. Moreover, the measurement should be taken at ambient, relatively constant temperature at each measurement.

OPERATION

Initial user calibration input jacks J1 and J3 are first connected together and to jack J2. The meter M1 is set to the reference mark on the meter face utilizing the meter set control conventionally provided for on the meter case. J1, J2 and J3 are then disconnected and the instrument is ready for use. Electrode contacts 24 and 26 are placed on separate measurement places on the body surface. For example, the electrode 24 is grasped firmly between the thumb and forefinger of one hand of the person to be tested and the electrode 26 is similarly grasped in the other hand. Lead wires 28 pass current from these electrodes in contact with the body surface to input jacks J1 and J3. This will measure accurately the body generated potentials at least as sensitivity as in D.C. milli-volts per day which changes slowly with time, as compared to measuring other body potentials such as heart muscle (EKG) which varies at a specific frequency with time. The presented circuit from measuring a body potential provides two primary requirements, namely it provides a measurement device which does not unduly load the potential source and thus mask critical signal parameters allowing a consequent better accuracy, and secondly the measurement device in the circuit shown has the ability to reject signals which are generated external to both the device and the body so that it may not appear in an additive manner with the desired signal. Again, for the specific purpose of measuring potentials due to ovulation within the body, the measurement area is confined to potentials which are basically D.C. in nature. The present instrument also possesses sufficient filtering in the input circuit to reduce or eliminate AC components which may be present due to other signal sources within the body. This filtering is achieved through the condensor-resistor network 12. Common mode rejection, elimination of outside signal sources, is achieved through networks 10 and 14 composed of active devices typically, operational amplifiers, A1, A2, A3, resistors R3, R4, R5, R6, R7, R8, R9, R11 and condensors C1, C2, C3 and C4.

Networks 16 and 18 comprised of amplifiers A4 and A5 and resistors R12, R13, R14, R15, R16, R17, R18, R19 and R20 and meter M1 are utilized to raise the signal level to a level sufficient for display purposes and to convert the input potential from a voltage to a format compatible with the indicating instrument, that is, the current to drive the instrument overall is powered by batteries E1 and E2 and all measurements are referenced to a precision common point which is derived by amplifier A5 and resistors R1 and R2.

FIG. 4 shows a typical curve illustrating approximate potentials developed by a female body over a 26 day ovulatory cycle. Typically, it will be noted that potentials will undulate slightly in a small wave appearance of moderate peaks and troughs before ovulation at a negative polarity, indicated at A and B indicative of the body potential condition substantially before and after ovulation. That about 5 or 6 days before the event of ovulation, the potential measured from the surface area will rise in a curve whose slope at various points C or D will progressively increase to indicate such preliminary phase of the ovulation cycle and the fact that the measurement proceeds the event by only a few days. At about the twelfth day and curve rises to a recognizable maximum or peak E, indicative of the fact of ovulation. The potential then decends rapidly, first in the area F indicating that ovulation has occurred and the progressively lower potentials, however, indicate the continuous presence of the ovum awaiting fertilization. When the potential finally reaches the latter part of the curve B and becomes negative, slowly approaching the normal non-ovalatory phase, the body will be recognized to be free of a fertilizable ovum.

For practical measurement of the phenomenon, a visible readout indicator is illustrated in FIG. 3 in which dial 34 is presented having an openly observable measuring strip 32. A fore portion 38 is light colored, and an after portion 40 is contrastingly colored, both portions or areas being separated by a critical position or line 42 intended to be placed at a point approximately corresponding to that of the lower rising curve portion C FIG. 4. That portion C will indicate by its slope that the potential has begun to rise at a rate where actual ovulation may be expected within a couple of days. Thus, following the curve, the indicating needle 44 position of FIG. 3, responsive to the measured potential developed in the meter M1, will move through a series of corresponding positions A, C, D, E, F and B from the area 38 past the critical mark 42. A first dotted line position of that needle will correspond to the position C or D on the curve of FIG. 4, showing that ovulation of the test subject is imminent, and the final dotted line position, the needle 44, having moved far to the right, will correspond to the peak position E of ovulation, indicative of the fact of ovulation. Thereafter, the measured potential will recede again through the intermediate position of the needle, corresponding again to the curve point F, and finally, the needle will return to the lower potential B or the first position of the needle 44. Thus, the visible indicator 34 actuated by potentials developed from a test individual, will indicate in positions A or B that no ovulation is or about to occur, and fertilization is not possible of that individual, and when the needle position moves into the contrasting colored area 40, that ovulation has or is about to occur, and fertilization of the ovum can take place.

FIG. 2 shows another type of measurement device in which the dial 34 has a calibrated measuring strip 30, so that the potential significant of positions A, B, C, D, E and F shown in FIG. 4, indicative of the phase of the ovulation cycle illustrated by this current, is shown visibly and numerically on the visible face of the dial 34 of FIG. 2. Thus, FIG. 2 and 3 represent ultimately useful types of visible indicator means to indicate the phase of the ovulation cycle. The first type, according to FIG. 3, is a yes or no type of indicator to indicate the prospective or fact of ovulation, and the second, according to FIG. 2, is to indicate the prospect of ovulation potential in terms of a numerical readout.

As indicated by use of the sensitized circuit, or one made even more sensitive by further filtering out of interfering potentials, the dial may be sufficiently sensitive to read in micro-volts, and that would be so calibrated at 34.

The circuit described in FIG. 1 is solid state type for optimum dependency, sensitivity and low noise. Indeed, each element of the several sections are composed typically of low noise elements whereby they provide optimum sensitivity.

While as described, the instrument comprising the detailed circuitry is designed to measure the fact as well as the timing of various phases of impending ovulation, whereby it is highly useful for measurement of that phenomena in human females; it is also applicable to test other mammals as a useful tool in animal breeding, or population control. For instance, in the breeding of valuable thoroughbred horses, cows or other domestic animals, the service provided, for instance, by the stallion or bull or by artificial insemination can be provided at an optimum time as indicated by the measured ovulation cycle, whereby the fertilization will be more certain. In this manner, the instrument is quite useful both to ascertain and aide in the fertilization of females both human or animal; or the opposite effect can be obtained to prevent fertilization, using the time cycle of ovulation as a guide measured by the present method.

The readout dial and electrodes of the device as described is simple and may be operated with contacts 24 and 26, but the current of one line 28 may be grounded to the casing and held in one hand with the fingers of the other hand either grasping only one lead or inserted in a hole in the casing (not shown) to complete the contact. It may also be useful to have the fingers contact the electrodes through a mechanism which controls the amount of pressure applied by the fingers, and to adjust the potential readings as a function of the applied pressure.

Certain modifications will occur to those skilled in the art, and accordingly is intended that the description as given be regarded as exemplary and not limiting except as defined in the claims.

We claim:
1. Method for determing the phase of an ovulation cycle in an adult mammalian female comprising applying conductive contacts each to a widely separated area of the body of the test individual remote from the ovulation site, measuring and visibly indicating the D.C. potential developed between the conductive contacts by a test circuit having a high input impedance and a high common mode rejection in which interfering potentials developed both within and without the test body have been removed, and identifying the phase of ovulation of the female corresponding to the measured D.C. potential.

2. The method as defined in claim 1 in which the conductive contacts are surrounded by an applied electroconductive substance to improve the conductivity of the contacts with the surface area of the test body.

3. The method as defined in claim 1 wherein the phase of ovulation cycle is identified relative to the maximum D.C. potential developed by the test individual at the ovulation maximum.

4. The method as defined in claim 1 wherein a curve representative of the ovulation cycle of a test individual established by periodic measurements of the potential and the phase of the ovulation is identified by the slope of the curve representative of the ovulation cycle of the test individual.

5. In a low D.C. potential measuring device for low voltage, for measurement and identifying phases of the ovulation cycle in adult female mammals measured at a point remote from the ovulation site, the combination of means for conductively contacting separate body portions remote from the ovulation site, means for measuring the potential developed between said contacting means which corresponds to the ovulation potential, and means for indicating said potential output, said measuring means including a high input impedance means and a high common mode rejection means for excluding and reducing interfering external and extraneous body generated potentials.

6. The device as defined in claim 5 wherein the operating elements of said measuring means are solid state and low noise amplifiers.

7. In a low D.C. potential measurement device for identification and measurement of ovulation phases in female mammals measured at a point remote from the ovulation site, the combination of means for conductively contacting separate body portions remote from the ovulation site, means for measuring the potential developed between said contacting means which corresponds to the ovulation potential, and means for indicating said potential output, said measuring means including a high input impedance means exceeding about $10^9$ ohms and a high common mode rejection means, and said indicating means including means for visibly indicating the developed output in D.C. potential in terms of the fact or imminance of ovulation.

8. The device as defined in claim 7 wherein said means for visibly indicating the developed output as a D.C. potential has visible markings divided into areas of higher and lower potentials developed in the test measurement and an indicator needle moveable through said areas responsive to said test potential, said areas being divided at a critical point, the lower potential area corresponding to a potential output of no ovulation in the test subject, and the higher potential area corresponding to a potential output approaching and shortly following ovulation over a measured time period of the test subject.

9. The device as defined in claim 7 wherein said means for visibly indicating the developed output D.C. potential has regularly spaced markings, said markings being spaced in a graduated scale calibrated to indicate the test D.C. potential output in milli-volts or micro-volts directly readable from said markings, and an indicator needle moveable across the spaced markings responsive to said test potential.

10. In a D.C. potential measurement device for identification of phases the ovulation phenomena in adult female mammals measured at a point remote from the ovulation site, the combination of means for conductively contacting separate body portions remote from the ovulation site, means for measuring the potential developed between said contacting means which corresponds to the ovulation potential, and means for indicating said potential output, said measuring including a high input impedance means, a high common mode rejection means, and signal processing means including input filtering means to exclude interfering extraneous signals and internal signals generated in the test subject being measured.

11. In a low D.C. potential measuring device for identification and measurement of ovulation phenomena in female mammals measured at a point remote from the ovulation site, the combination of separate body contact electrodes to sense the ovulation potential from separated surface areas of the test body applied remote from the ovulation site, circuit means for measuring the potential developed between said electrodes which corresponds to the ovulation potential, said circuit means including high input impedance means in the range of about $10^9$ to $10^{14}$ ohms, high common mode rejection means and signal processing means to exclude interfering and masking AC potentials and test body generated DC potentials other than from ovulation and visual readout means to identify said potential.

12. The device as defined in claim 11 wherein the operating elements of said circuit means are solid state and low noise amplifiers.

13. The device as defined in claim 12 wherein said circuit means further includes filtering means, and batteries as the source of the driving potential, said circuit means further including means for maintaining said battery potential at an average substantially constant intermediate value.

14. In a low D.C. potential measuring device for measurement and identifying phases of the ovulation cycle in adult female mammals measured at a point remote from the ovulation site, the combination of means for conductively contacting separate body portions remote from the ovulation site, means for measuring the potential developed between said contacting means which corresponds to the ovulation potential, and means for visibly indicating said potential output, said measuring means including low noise solid state elements providing high input impedance means in circuit with a common mode rejection means, filtering means in said measuring means comprising low noise elements, said high input impedance means and said common mode rejection means reducing interfering external and extraneous body generated potentials, said impedance means being in the range of about $10^{10}$ and $10^{14}$ ohms, a pair of batteries in series with said measuring means providing a powering potential for its operation, and means for maintaining said batteries output at a substantially constant intermediate value.

15. The device as defined in claim 14 wherein said means for visibly indicating the developed output D.C. potential has regular visible markings, said markings being spaced in a graduated scale calibrated to indicate the test output in milli-volts or micro-volts directly readable from said markings, and an indicator needle moveable across the spaced markings responsive to said test potential.

* * * * *